Aug. 3, 1965　　F. G. MILLER ETAL　　3,198,608
PROCESS FOR PREPARING CULINARY SALT
Filed June 24, 1959
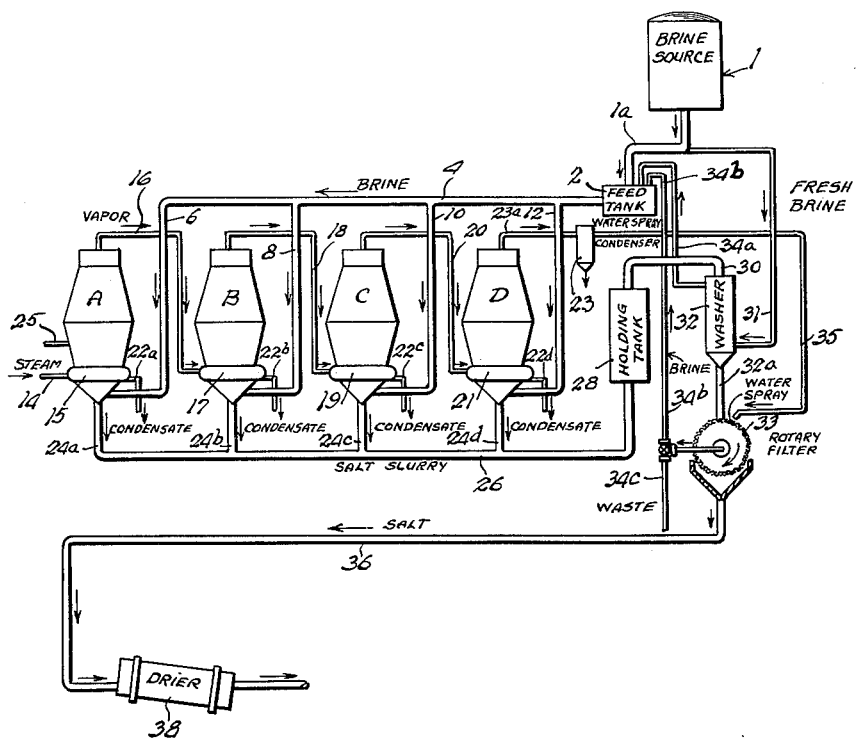
INVENTORS.
Frank George Miller &
BY. Elaine Ann Dittmar

United States Patent Office 3,198,608
Patented Aug. 3, 1965

3,198,608
PROCESS FOR PREPARING CULINARY SALT
Frank George Miller, Lake Bluff, and Elaine Ann Dittmar, Chicago, Ill., assignors to Morton Salt Company, Chicago, Ill., a corporation of Delaware
Filed June 24, 1959, Ser. No. 822,589
10 Claims. (Cl. 23—300)

This invention relates to improvements in processes for preparing sodium chloride, and more particularly to a process of treating sodium chloride brines to produce a culinary salt having improved properties with respect to pro-oxidant effects when incorporated in fats or oils.

Generally the ordinary culinary salt of commerce, while highly refined, contains trace amounts of certain heavy metal salts. Although these heavy metal salts, chiefly copper and iron, are present in relatively small amounts, they have a pronounced effect on the storage stability of certain fats and oils when salt containing them is incorporated therein. The primary problem which has been noted in connection with these trace impurities is that they act in the capacity of catalytic agents or pro-oxidants when present in certain unsaturated fats, oils or the like, promoting the oxidative degradation which is the chief characteristic of rancidity. It has been the experience of the food industry that when trace amounts of these heavy metal salts are present in a culinary salt which is subsequently incorporated into unsaturated fats, oils, and the like, such as are used for cooking or food purposes, i.e. peanut butter, peanut oil, butter, oleomargarine, lard, corn oil, and the like, oxidative degradation is enhanced. Thus it has been found that where salts of such metals as copper and iron are present in the salt, the fats and oils wherein the salt is incorporated, have a substantially reduced storage life before rancidity and oxidation render them unpalatable or unfit for use.

While it might be deemed desirable to process culinary salts in such a manner as to entirely remove such trace amounts of heavy metal salts or pro-oxidants as might be present, it has heretofore been the experience of those skilled in the art that such a processing procedure is so involved as to be economically impractical.

Several alternatives have been proposed to eliminate or reduce the pro-oxidative effect caused by these impurities, and thereby substantially increase the storage life of unsaturated fats and oils. One such alternative presently in commercial use involves the addition of certain anti-oxidant materials, such as for example, alkylated phenols which inhibit the oxidative reaction which is promoted by the catalytic activity of these pro-oxidant heavy metal materials. This expedient, while achieving some degree of success, has not been altogether satisfactory inasmuch as the storage stability is only partially improved; it involves the addition of a foreign material into the salt, which may have deleterious effects when consumed, or impart an off-flavor or color to the food.

Another possibility for the improvement of salts containing trace amounts of copper and iron involves the use of certain organic chemicals classified as chelating agents, which have the characteristic of reacting with heavy metals to produce an organo-metallic complex of such stability that the pro-oxidant effects previously exerted by the salts or ions of the heavy metal materials, such as copper or iron, are largely eliminated. One such example of this expedient is disclosed in U.S. Patent No. 2,868,655, which discloses admixing sodium chloride and a small amount of ethylene diamine tetra acetic acid, and forming therefrom a tablet which is utilized in the canning of various seafoods. While this innovation has been satisfactory to some degree, it is believed that certain drawbacks militate against its use under all conditions. For example, the procedure disclosed in that patent involves the use of mixture of sodium chloride and ethylene diamine tetra acetic acid introduced into food stuffs in tablet form, and it is obvious that it would be desirable in many instances to introduce the material as a loose granular or fine powder. This, of course, would involve certain problems of uniformity of mixing to assure that the ethylene diamine tetra acetic acid was uniformly distributed throughout the salt.

A further difficulty resides in the fact that traces of the pro-oxidant salts are often present within the individual salt crystals as occluded particles, and the use of small amounts of chelating agent as additives to the surface of the salt particles does not assure that all of these occluded salts would be effectively deactivated.

Additionally, it is known that ethylene diamine tetra acetic acid has chelating powers with respect to salts other than the heavy metals, and that any unreacted chelating agent has the capacity to remove salts, such as calcium, from the body tissues when ingested by mammals, which is obviously detrimental.

Accordingly it would be desirable to provide a process for preparing a culinary salt having improved or reduced pro-oxidant effects.

It is therefore one of the objects of the present invention to provide a process for preparing a culinary salt, having a reduced pro-oxidant effect when used in fats and oils, which does not involve the admixing with the salt of anti-oxidants or chelating agents.

A further object is the provision of a process for preparing a culinary salt which involves treating a salt brine containing trace amounts of copper and iron by a process which is both simple and economical.

These and other objects of this invention may be more readily seen and understood by reference the following specification, examples, and appended claims.

In one broad form the present invention comprises a process for producing a culinary salt having reduced pro-oxidant properties which comprises crystallizing sodium chloride by concentrating a saturated brine containing trace amounts of heavy metal pro-oxidant salts in the presence of an ethylene diamine tetra acetic acid compound, recovering the crystallized sodium chloride salt from the saturated brine supernate as a slurry, washing said slurry of sodium chloride crystals substantially free of ethylene diamine tetra acetic compound, and drying the sodium chloride.

The brine starting material in the present process may be prepared from crude sodium chloride which has been treated to remove major impurities, such as calcium sulfate, magnesium chloride, or the like. The salt used in the preparation of the brine ordinarily contains small amounts of the heavy metal pro-oxidant salts, such as copper and iron. These metals may be present in concentrations of from 0.1 to 2 p.p.m. (parts per million) copper; in the case of iron from 0.2 to about 4 p.p.m. Brine taken directly from the well may also be utilized in this process after conventional suitable treatment to remove hydrogen sulfide, calcium carbonate, magnesium sulfate, calcium sulfate, calcium chloride, magnesium chloride, sulfur, and excess iron. Low calcium and low iron brine is a preferred starting material for this process. The brines prepared by these and other methods are usually saturated and contain about 26% sodium chloride. While it is not essential that the starting brine be saturated in this process, since the evaporation step brings it to the saturated level in the crystallization step, it is the more economical and preferred process.

The ethylene diamine tetra acetic acid compound (hereinafter called E.D.T.A. for the sake of brevity) may be utilized in the form of the acid per se or as water soluble salts such as alkali or alkaline earth metal salts. Suitable salts of the E.D.T.A. which may be used are the tetra sodium, the disodium calcium, or the disodium dihydrogen. The amount of the E.D.T.A. compound may vary from about 5 to about 1000 p.p.m. on a salt basis, or in the most preferred aspects from about 20 to about 600 p.p.m. These values may be converted to a brine basis by multiplying by the concentration of the brine, which in the case of saturated brine is about 26% (weight basis), e.g. a factor of 0.26.

The crystallization step is preferably carried out under neutral or alkaline conditions, that is, a pH of 7 or above. A most preferred range of alkalinity is a pH of from about 8.0 to 10.

The evaporation and crystallization of the salt from the brine solutions may be carried out in multiple stage vacuum pans or evaporators as well as by other well known processes.

For a clearer understanding of the present process reference should be had to the drawing which comprises a flow sheet or schematic diagram illustrating in one form the apparatus utilized in carrying out the process of the present invention.

Source brine 1 passed via line 1a to feed tank 2 is fed through conduit 4, and thence through feed lines 6, 8, 10 and 12 to evaporators or vacuum pans A, B, C and D. Superheated steam is fed to steam jacket 15 on evaporator A through steam line 14. The vapor from evaporator A passes through vapor line 16 to the steam jacket 17 on evaporator B. Likewise vapor from evaporator B passes through line 18 to steam jacket 19 on evaporator C and the vapor from evaporator C through line 20 to steam jacket 21 on evaporator D. The vapor from each of the evaporation units A through C is used as a heat source for the succeeding evaporator. In each instance the condensate from the heating jackets 15, 17, 19 and 21, is removed from the system by means of lines 22a, 22b, 22c and 22d. This condensate may be returned to the steam generator or boiler for reheating. The vapor from evaporator D passing through line 23a is condensed and stored in condenser 23 and used for washing the salt product. As may be readily understood, there is a cooling effect in each of the evaporators and accordingly each system should be operated at successively lower pressure to maintain the evaporation at the maximum rate. Thus the steam introduced through line 14 to evaporator A is at a sufficient pressure (and accordingly temperature) to heat the brine in evaporator A to about 226° F. The crystallization of sodium chloride from the brine is conventionally carried out in evaporator A at atmospheric pressure or slightly below atmospheric pressure. A temperature drop through the system illustrated will produce a brine temperature in pan D of about 110° F. The pressure at which this last pan or evaporator operates is about 1" of mercury (absolute) or alternatively stated at about 29 inches of mercury vacuum. The intermediate evaporators or pans B and C are operated at pressures such as to maintain evaporation (boiling) for the particular temperature of the vapor from the preceding evaporator. Of course, depending upon the efficiency of the units and other considerations, it is obvious that the temperature drops through all evaporators are variable and may be controlled within reasonable limits.

The E.D.T.A. compound may be introduced into the brine in the separate evaporators either separately (see feed line 25 on pan A) or at the feed tank 2 (not shown). The concentration of the E.D.T.A. compound is maintained at the desired level and interim analysis in each tank may be conveniently had to determine the amount present.

The evaporation and consequent concentration of the brine carried out in the pans results in the crystallization of the sodium chloride salt from the brine. The sodium chloride or salt crystals are removed from each evaporator through lines 24a, 24b, 24c and 24d to main line 26 as a slurry of salt in supernate brine from the evaporator. The salt slurry is then passed via 26 to a holding tank 28 and thence through line 30 to a countercurrent washer 32. The salt slurry is washed free of traces of E.D.T.A. compounds in washer 32 with fresh brine rinses from brine source 1 through line 31. The salt slurry is then passed via line 32a to rotary filter 33. A final spray rinse and washing of the salt on a rotary filter 33 is with fresh water, conveniently taken, if desired, from the cooled condensate from tank D stored in condenser 23 via line 35. If desired, a portion of condensate from lines 22a, 22b, 22c and 22d may also be used for washing the salt on rotary filter 33. The brine washings from the washer 32 and filter 33, containing traces of E.D.T.A. compound, may be returned to the feed tank 2 via conduits 34a and 34b to be recycled in the process.

The washings from rotory filter 33 may also be discarded via line 34c, if desired, although this is not the preferred procedure. The damp salt from rotary filter 33 passes through conduit 36 to a drier 38, operated at a temperature of about 300° F., and the dried salt from the drier then may be packaged.

In one specific example of the process of the present invention, as carried out in the described apparatus, a saturated brine from feed tank 2 containing 0.6 part per million of copper and 0.9 part per million of iron on a dry salt basis, was fed through conduit 4 and lines 6, 8, 10 and 12 to evaporators A, B, C and D. The tetrasodium salt of ethylene diamine tetra acetic acid was introduced into the evaporators in an amount sufficient to result in a concentration of 185 parts per million (brine basis). The pH of the solution was 8.9. The sodium chloride slurry recovered from the evaporators was washed with fresh brine and water (condensate) at a rate calculated to dissolve not more than 5% of the salt produced and sufficient to remove all of the E.D.T.A. salts. The salt was then dried and packaged. The product on analysis contained 0.4 part per million copper and 1.0 part per million iron. (An increase in iron is due to pick-up from the equipment used.)

Tests were carried out on various salts prepared by the process of the present invention to determine their pro-oxidant effects. A salt containing 0.95 part per million copper and 0.85 part per million iron was utilized to prepare a saturated brine. To the saturated brine thus prepared was added tetrasodium E.D.T.A. in an amount equal to 25.6 parts per million (salt basis). Sodium hydroxide was added to bring the pH of the brine to 10.0. The brine containing the E.D.T.A. salt was concentrated by heating and evaporation at elevated temperatures, i.e. 224–226° F. The crystals of sodium chloride formed during the evaporation step were recovered as a damp slurry from the supernate brine, washed with fresh brine solution and water to remove all residual E.D.T.A. salts. The rate of washing was carried so that less than 5% of the salt product was removed. After washing, the product was dried by heating at elevated temperatures, i.e. about 300° F. The salt product so formed was analyzed for the E.D.T.A. by the method of Analytical Chemistry, volume 24, page 373, February, 1952. No E.D.T.A. was found. The lower limit of detectability for this method is 0.5 part per million. Analysis for copper and iron indicated 0.3 and 1.8 p.p.m., respectively. The analytical methods used for copper and iron are described by Sandell "Colorimetric Determination of Trace Metals" Interscience Pub. Co., 1944, pages 221 and 263, with the modification that the sample is heated in a platinum crucible two hours at 625° C. to destroy chelates of these metals, if present, prior to analysis.

Elevated temperature oven storage tests were utilized to determine the pro-oxidant effect of the salt treated by the present process. In this experiment 55 grams of salt were added to 19 grams of steam rendered lard, blended and placed in a 100 milliliter beaker. The salt was completely covered with the fat and no fat layer formed on top of the salt. Each beaker was covered with a filter paper and placed in an oven maintained at 45° C. From time to time a sample was removed and the peroxide value of the fat determined. Curves of peroxide development against time were plotted and the stability of each sample was taken as the time required for the fat to reach a peroxide value of 20 milli-equivalents per kilogram. Several other samples of untreated salt were also included to show the effect of various amounts of copper and iron. The results of the test were as follows:

Table (A): Stability in hours

Lard plus untreated salt containing 0.95 p.p.m.
Cu _____ 45
and 0.85 p.p.m. Fe _____ 44

Average _____ 44

(B):
Lard plus treated salt containing 0.3 p.p.m. Cu
and 1.8 p.p.m. Fe _____ 146

(C):
Lard plus untreated salt containing 0.22 p.p.m.
Cu _____ 33
and 0.6 p.p.m. Fe _____ 37

Average _____ 35

(D):
Lard plus salt containing 0.5 p.p.m. Cu _____ 23
and 0.8 p.p.m. Fe _____ 26

Average _____ 25

Samples C and D are given in the table for the purpose of showing that the increased stability achieved in the large sample containing salt treated by the process of the present invention is not due to the decreased copper content. Thus sample C containing a salt having 0.22 p.p.m. Cu has an average stability of 35 hours as contrasted to the 146 hours of sample B. Likewise sample D containing a salt with 0.5 p.p.m. Cu has an average stability of 25 hours.

From the foregoing it may be seen that treatment of brines made from salt containing trace quantities of copper and iron by the process of the present invention produces a culinary salt having greatly reduced pro-oxidant properties. For example, in the specific test shown above, a stability improvement of about 330% was achieved in fats containing salt treated by the present process as contrasted with the untreated control. It is obvious that the process of the present invention produces a salt which is capable of being used with a broad variety of unsaturated fats and oils to produce a product with a substantially increased storage life.

It should be understood that while the foregoing illustration was directed to the use of the process of the invention in conjunction with vacuum pan crystallization apparatus, it is also possible to carry out this process by the use of other well known techniques and apparatus, such as may be exemplified by various open pan salt crystallization methods or the like.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

We claim:

1. A process for producing a culinary salt having reduced pro-oxidant properties which comprises, treating a sodium chloride brine containing a heavy metal pro-oxidant selected from the group consisting of copper and iron, said copper being present in an amount of from about 0.1 to 2 parts per million (salt basis) and said iron being present in an amount of from about 0.2 to 4 parts per million (salt basis), with an EDTA compound selected from the group consisting of ethylenediaminetetr- acetic acid and water soluble alkali and alkaline earth metal salts thereof crystallizing salt from said brine, by concentration and evaporation at a pH ranging from neutral through alkaline conditions to produce crystalline salt in supernate brine, recovering said salt from the supernate concentrated brine and removing traces of said ethylenediaminetetracetic acid compounds from said recovered salt.

2. The process of claim 1 wherein the removal of ethylenediaminetetracetic acid compounds is accomplished by washing with fresh brine and water.

3. The process of claim 2 wherein the brine washings are recirculated to the feed brine and recycled in the process.

4. The process of claim 1 wherein the EDTA compound is present in an amount of from 5 to 1000 parts per million on a salt basis.

5. The process of claim 1 wherein the EDTA compound is present in an amount of from 20 to 600 parts per million on a salt basis.

6. A process for producing culinary salt having reduced pro-oxidant properties which comprises forming a brine from a salt containing a heavy metal pro-oxidant selected from the group consisting of copper and iron, said copper being present in an amount of from about 0.1 to 2 parts per million (salt basis) and said iron being present in an amount of from about 0.2 to 4 parts per million (salt basis), with an EDTA compound selected from the group consisting of ethylenediaminetetracetic acid and water soluble alkali and alkaline earth metal salts thereof crystallizing salt from said brine by concentration and evaporation at a pH ranging from neutral through alkaline conditions to produce crystalline salt in supernate concentrated brine, recovering said salt from the supernate concentrated brine as a slurry of salt in supernate brine and washing said salt slurry to remove traces of said ethylenediaminetetracetic acid compounds from said recovered salt.

7. The process of claim 6 wherein the EDTA compound is present in an amount of from 5 to 1000 parts per million.

8. The process of claim 6 wherein the removal of ethylene diamine tetra acetic acid is accomplished by washing with fresh brine and water.

9. The process of claim 6 wherein the brine washings are recirculated to the feed brine, and recycled in the process.

10. The process of claim 6 wherein the washing is carried out at a rate so as to dissolve less than 5% of the salt product.

References Cited by the Examiner

UNITED STATES PATENTS

| | | | |
|---|---|---|---|
| 400,983 | 4/89 | Williams et al. | 23—273 |
| 2,642,335 | 6/53 | May | 23—300 |
| 2,669,520 | 2/54 | Fellers | 99—160 |
| 2,753,242 | 7/56 | Davis | 23—303 X |
| 2,868,655 | 12/56 | Ladenburg | 23—89 |

FOREIGN PATENTS 779,742 7/57 Great Britain.

OTHER REFERENCES

The Versenes—Technical Bulletin #2, July 1952, Bersworth Chemical Co., sec. II, pp. 44–45; sec. I, pp. 1 to 7.

Sequestrine—publication of Geigy Industrial Chemicals, pp. 1, 2, 20, 25 and 29, copyright 1952.

Chemistry of the Metal Chelate Compounds, Martell and Gavin, QD 411 M 38 C. 7, 1952, pages 205–206, 511–512.

NORMAN YUDKOFF, *Primary Examiner.*

GEORGE D. MITCHELL, MAURICE A. BRINDISI,
*Examiners.*